Patented Feb. 29, 1944

2,342,760

UNITED STATES PATENT OFFICE 2,342,760

PROCESS FOR THE MANUFACTURE OF ALKALINE EARTH METAL SALTS OF ADENOSINE POLYPHOSPHORIC ACIDS

Herbert Schwaneberg, Berlin-Tempelhof, Germany; vested in the Alien Property Custodian No Drawing. Application May 20, 1940, Serial No. 336,304. In Germany August 4, 1939

9 Claims. (Cl. 195—28)

It is known from the work of Needham and van Heynigen which was published in "Nature" volume 135 (1935) pages 585 and 586, that adenosine triphosphoric acid is formed by the addition of phosphoglyceric acid and adenylic acid to muscle extract containing alkali. Working with muscle extract is, however, too complicated and expensive in practice, the more so because the yields obtained are not satisfactory.

It is also known from the work of Ostern and Terszekowec published in Hoppe-Seyler's Zeitschrift für physiologische Chemie, volume 250 (1937) pages 155–157 that adenosine, in the presence of inorganic phosphate and under the action of yeast, forms adenosine triphosphoric acid in addition to adenosine-5-monophosphoric acid.

A process of this nature is described and claimed in U. S. Patent No. 2,174,475. When working in accordance with this process, however, adenosine-5-monophosphoric acid is mainly obtained; sometimes it is mixed with some adenosine triphosphoric acid or also with some adenosine polyphosphoric acid.

An object of my present invention is to obtain, instead of the above-mentioned mixture which always contains considerable amounts of adenosine monophosphoric acid, substantially only adenosine polyphosphoric acids, and especially adenosine triphosphoric acid, which are 75–100% pure, and in particular, are free from adenosine monophosphoric acid.

A further object of my invention is to obtain a new preparation for acting on the circulatory system, especially of human beings, which is more efficacious than the known adenosine monophosphoric acid which has hitherto been used for this purpose, namely a preparation which consists for the most part of adenosine polyphosphoric acids and especially adenosine triphosphoric acid.

A still further object of my invention is to obtain therapeutically valuable salts such as, for example, calcium salts of adenosine polyphosphoric acids, directly from the reaction mixture which contains the crude adenosine polyphosphoric acids and adenosine triphosphoric acid in particular, that is to say without forming other compounds of these acids.

Finally, yet another object of my invention is to convert the adenosine polyphosphoric acids directly or indirectly into salts of various therapeutically valuable metals.

Further objects and advantages of my present invention will be clear from the following description and examples.

Adenosine as such or any compound which can be split up to form adenosine, such as for example yeast nucleic acids, can be used as the starting material in the new process as in the known process. As the phosphate there may be used either inorgnic phosphate buffer solutions or also the known sugar phosphoric acid esters such as, for example, the so-called Neuberg, Robison, Cori, Embden, Harden and Young esters; phosphoglyceric acid or mixtures of organic and inorganic phosphate can also be used. These starting materials are converted by the action of fresh yeast, dry yeast or yeast extract or yeast plasmolysate into adenosine triphosphoric acid and adenosine polyphosphoric acid. It is important that the yeast be added to the reaction mixture in prefermented condition and preferably in stages. The yeast contains two enzymes of which the one, namely the so-called phosphatase, has a dephosphorylating action, while simultaneously a second enzyme which is present in the yeast has a phosphorylating action, namely in the 5-position of the ribose contained in the adenosine. It has now been found that by a vigorous fermentation of the yeast the result can be obtained that this second enzyme strongly predominates, so that the phosphorylation of the adenosine proceeds not only as far as muscle adenylic acid (adenosine-5-monophosphoric acid) but up to the desired adenosine polyphosphoric acid. The predomination of the phosphorylating enzyme may be ensured, in particular by adding the vigorously fermenting yeast in stages to the reaction mixture in order to prevent with certainty the production of phosphatase. As soon as analysis shows that the taking up of phosphate has proceeded sufficiently far the mixture is quickly boiled in order to destroy the phosphatase present. This boiling must take place as quickly as possible and preferably within about 10–20 minutes in order to prevent hydrolysis of the polyphosphoric acids formed. For the same reason the highly heated mixture must also be rapidly cooled down since otherwise dephosphorylation can occur by hydrolysis.

The solution obtained in this manner which contains practically the whole of the adenosine in the form of polyphosphoric acids is preferably worked up in the following manner.

The liquor which is freed form insoluble matter by filtration is treated with a concentrated solution of a salt of an alkaline earth metal, such as barium acetate for example, in order to precipitate the whole of the adenosine polyphosphoric acids in the form of their barium salts.

This barium salt is then treated with dilute sulphuric acid in such a way that the whole of the barium is present as sulphate. The solution, which contains the free adenosine triphosphoric acid and adenosine polyphosphoric acid is rapidly separated from the precipitate by centrifuging in order that the excess of acid may cause no harmful hydrolysis and is then poured into 5-10 times its amount of alcohol. By this means adenosine triphosphoric acid is separated as a white powder. It is practically free from inorganic phosphate and is contaminated only by a small quantity of hexose diphosphoric acid from which it can easily be separated if this is desired.

Another method which leads directly to therapeutically useful salts of adenosine polyphosphoric acids is to treat the solution, after boiling and filtering, with a concentrated solution of a calcium salt, for example calcium chloride, in the calculated quantity and to add alcohol. In this way the calcium salts of adenosine polyphosphoric acids are precipitated and can be used directly as a medicament.

The adenosine polyphosphoric acids which are obtained in a degree of purity from 75-100% can be used for the manufacture of potassium, sodium, magnesium, manganese salts and so forth which are important as agents for affecting the circulatory system.

The invention will now be explained in greater detail with the aid of the following examples.

Example 1

1 kg. of beer yeast is stirred with 1 litre of 20% glucose solutions, 3 litres of $m/3$ sodium phosphate (pH 7) and 5 litres of a 1% adenosine solution are added and the mixtures is fermented at 37° C. After 1 hour 1 kg. of yeast, which has been caused to ferment with 1 litre of 10% glucose solution and 300 cc. of toluene are added and the addition of the yeast is repeated after a further hour. The stirring is continued during the whole experiment. The amount of inorganic phosphorus taken up is continuously checked and the experiment is broken off when phosphorus is no longer taken up. Then the solution is rapidly boiled and then immediately cooled down and filtered. The solution is made alkaline with caustic soda solution and is precipitated with barium acetate. The crude barium adenosine polyphosphate is centrifuged and washed with water and alcohol.

If the crude phosphate, while being cooled, is stirred with the necessary quantity of dilute sulphuric acid and at once centrifuged and the solution poured into several times its volume of alcohol and stirred, a white flocculent product is obtained which consists substantially of crude adenosine polyphosphoric acids. This is at once filtered off and washed with alcohol and ether. It is very sensitive to moisture and must be dried at once in the desiccator.

Example 2

1 kg. of beer yeast is stirred with 1 litre of 10% glucose solution, 3 litres of $m/6$ sodium phosphate (pH 7) and 5 litres of 1% adenosine solution are added and the mixture is fermented at 37° C. After 20 minutes 75 grams of the sodium salt of fructose diphosphoric acid (1 litre dissolved) and 300 cc. of toluene are added and after a further 20 minutes 1 kg. of yeast which has been prefermented with 1 litre of 10% glucose solution is again added. Instead of fructose diphosphoric acid the corresponding quantity of phosphoglyceric acid can be taken. The further treatment is carried out in the same way as in Example 1.

Example 3

1 kg. of beer yeast is stirred with 1 litre of 10% glucose solution and after the vigorous fermentation has begun 5 litres of 1% adenosine solution, 150 grams of the sodium salt of fructose-diphosphoric acid in 3 litres of water, or the corresponding quantity of the sodium salt of phosphoglyceric acid, and 300 cc. of toluene are added. The mixture is stirred and is kept at a temperature of 37° C. After 30 minutes 1 kg. of beer yeast which is fermenting with 1 litre of 10% glucose solution is again added. The further treatment then proceeds as described in Example 2.

Some preferred methods of carrying the invention into effect have been described in detail, but the invention is not limited in any way to the reaction temperatures, concentrations and other conditions which have been numerically indicated. These can be varied according to the circumstances of a particular case without departing from the scope of the invention. The invention is limited only by the following claims, taking into account the state of the prior art.

I claim:

1. A process for the manufacture of alkaline earth metal salts of adenosine polyphosphoric acids which comprises the following steps: attaching phosphoric acid residues to adenosine by the action of yeast by introducing yeast in vigorous fermenting condition in batches into a reaction mixture containing adenosine, a sugar which is fermentable by yeast and a phosphoric acid residue, leaving the mixture to fermentation after the addition of yeast, rapidly boiling the mixture, then rapidly cooling it down, separating the soluble from the insoluble matter, adding an alkaline earth to the solution and separating the alkaline earth metal salts of the adenosine polyphosphoric acids.

2. A process for the manufacture of adenosine polyphosphoric acids comprising the following steps: attaching phosphoric acid residues to adenosine by introducing yeast in vigorous fermentating condition in a plurality of batches into a reaction mixture containing adenosine, a sugar which is fermentable by yeast and polyphosphoric acid residues, leaving the mixture to fermentation after the addition of yeast, quickly boiling the solution, then rapidly cooling it down, separating the soluble from the insoluble matter, adding an alkaline earth to the solution obtained, separating the alkaline earth metal salts of adenosine polyphosphoric acids, decomposing these salts with a mineral acid and precipitating by addition of alcohol the adenosine polyphosphoric acids from the solution.

3. A process for the manufacture of salts of adenosine polyphosphoric acids comprising the following steps: attaching phosphoric acid residues to adenosine by the action of yeast by introducing vigorously fermenting yeast in a plurality of batches into a reaction mixture containing adenosine, a sugar which is fermentable by yeast and phosphoric acid residues, leaving the mixture to fermentation after the addition of yeast, rapidly boiling the mixture, then rapidly cooling it down, adding an alkaline earth to the solution obtained, separating the alkaline earth metal salts thereby obtained of the adenosine polyphosphoric acids, decomposing the salts obtained with acid, precipitating adenosine polyphosphoric acids from the solution obtained and converting the adenosine polyphosphoric acids obtained into metal salts.

4. A process for the manufacture of adenosine polyphosphoric acids comprising the following steps: attaching phosphoric acid residues to adenosine by the action of yeast by introducing yeast in prefermented condition in a plurality of batches into a reaction mixture containing adenosine, a sugar which is fermentable by yeast, and phosphoric acid residues, leaving the mixture to fermentation at about 37° C. after the addition of yeast, rapidly boiling the mixture within a time which is not substantially longer than 20 minutes, then rapidly cooling it down, adding an alkaline earth, separating the alkaline earth metal salts thereby obtained of the adenosine polyphosphoric acids and decomposing these salts with mineral acids.

5. A process for the manufacture of adenosine polyphosphoric acids comprising the following steps: attaching phosphoric acid residues to adenosine by the action of yeast by adding a plurality of batches of vigorously fermenting yeast to a reaction mixture which contains adenosine, a sugar which is fermentable by yeast and an organic phosphate buffer solution having a pH value of about 7, leaving the mixture to fermentation after the addition of yeast, rapidly boiling the mixture, rapidly cooling it down, adding an alkaline earth to the solution obtained, separating the alkaline earth metal salts of the adenosine polyphosphoric acids and decomposing these salts with acid.

6. A process for the manufacture of adenosine polyphosphoric acids comprising the following steps: attaching phosphoric acid residues to adenosine by the action of yeast by adding yeast in prefermented condition in several batches to a reaction mixture containing adenosine, a sugar which is fermentable by yeast and a sugar-phosphoric acid ester, leaving the mixture to fermentation after the addition of yeast, rapidly boiling the mixture, then rapidly cooling it down, adding an alkaline earth to the solution obtained, separating the alkaline earth metal salts of the adenosine polyphosphoric acids and decomposing these salts with acid.

7. A process as claimed in claim 2 wherein the yeast employed is beer yeast.

8. A process for the manufacture of adenosine triphosphoric acids in a substantially pure condition comprising the following steps: attaching phosphoric acid residues to adenosine by the action of yeast by introducing yeast in prefermented condition and in a plurality of batches into a reaction mixture containing adenosine, a sugar which is fermentable by yeast, and phosphoric acid residues, rapidly boiling the mixture, rapidly cooling it down, treating the solution with an alkaline earth, separating the alkaline earth metal salts thereby obtained of the adenosine triphosphoric acid and decomposing these salts with acid.

9. A process as claimed in claim 8 wherein the pH value of the reaction mixture containing the yeast, adenosine and phosphoric acid residue is kept at about 7 by the presence of an inorganic phosphate buffer solution.

HERBERT SCHWANEBERG.